US012363106B2

(12) United States Patent
Miel et al.

(10) Patent No.: US 12,363,106 B2
(45) Date of Patent: Jul. 15, 2025

(54) RISK-BASED FACTOR SELECTION

(71) Applicant: Cisco Technology, Inc., San Jose, CA (US)

(72) Inventors: Shayne Miel, Durham, NC (US); Joshua Terry, Round Rock, TX (US); Richard Harang, Alexandria, VA (US); Kevin Tyler Burchfield, Ypsilanti, MI (US); Gillian Gacusan, Austin, TX (US); Patrick McMahon, Dexter, MI (US); Robert Small, Ann Arbor, MI (US); Jake Ingman, Saint Paul, MI (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 18/156,974

(22) Filed: Jan. 19, 2023

(65) Prior Publication Data
US 2024/0250942 A1    Jul. 25, 2024

(51) Int. Cl.
*H04L 9/40* (2022.01)
*G06F 21/45* (2013.01)
*G06F 21/62* (2013.01)

(52) U.S. Cl.
CPC .......... *H04L 63/0853* (2013.01); *G06F 21/45* (2013.01); *G06F 21/6245* (2013.01); *H04L 63/1433* (2013.01)

(58) Field of Classification Search
CPC .............................. G06F 21/6245; G06F 21/45
See application file for complete search history.

(56) References Cited

U.S. PATENT DOCUMENTS

| | | | |
|---|---|---|---|
| 9,160,726 B1 | 10/2015 | Kaufman et al. | |
| 9,374,369 B2* | 6/2016 | Mahaffey | G06F 21/6245 |
| 9,667,611 B1 | 5/2017 | Friedman et al. | |
| 10,951,606 B1 | 3/2021 | Shahidzadeh et al. | |
| 2005/0097320 A1 | 5/2005 | Golan et al. | |
| 2009/0097661 A1* | 4/2009 | Orsini | G06F 21/45 |
| | | | 380/279 |
| 2017/0109509 A1 | 4/2017 | Baghdasaryan | |
| 2022/0027919 A1 | 1/2022 | Bermudez-Ciscneros et al. | |
| 2024/0195797 A1* | 6/2024 | Miel | H04L 63/0853 |

* cited by examiner

Primary Examiner — Barbara B Anyan
(74) Attorney, Agent, or Firm — Polsinelli P.C.

(57) ABSTRACT

The present technology provides for altering an authentication technique in response to a detection of a possible attack to which the authentication technique is vulnerable. An authentication provider can receive an authentication request to authenticate to a first resource, where the authentication to the first resource is permitted using a particular authentication technique, includes contextual information associated with the first access device and information identifying the first resource. Based on the contextual information, the authentication provider can determine that the authentication request is subject to an ongoing attack, and determine, an alternative authentication technique that is less vulnerable to the ongoing attack than the particular authentication technique. The authentication provider can require the first user account to authenticate with the first resource using the alternative authentication technique that is less vulnerable to the ongoing attack than the particular authentication technique.

20 Claims, 8 Drawing Sheets

RISK-BASED FACTOR SELECTION

TECHNICAL FIELD

The present disclosure relates to multi-factor authentication. Aspects of the disclosure involve identifying risks related to multi-factor authentication and adjusting available authentication methods to mitigate the identified risk.

BACKGROUND

Two-factor authentication (2FA) is a simple, effective way to make sure users are who they say they are. Two-factor authentication is important to network security because it mitigates the risks associated with compromised passwords. If a password is hacked, guessed, or phished, it is no longer enough to give an intruder access because without approval at the second factor, a password alone may not be useful. However, 2FA is not impervious to nefarious attempts that try to circumvent the second factor authentication methods.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
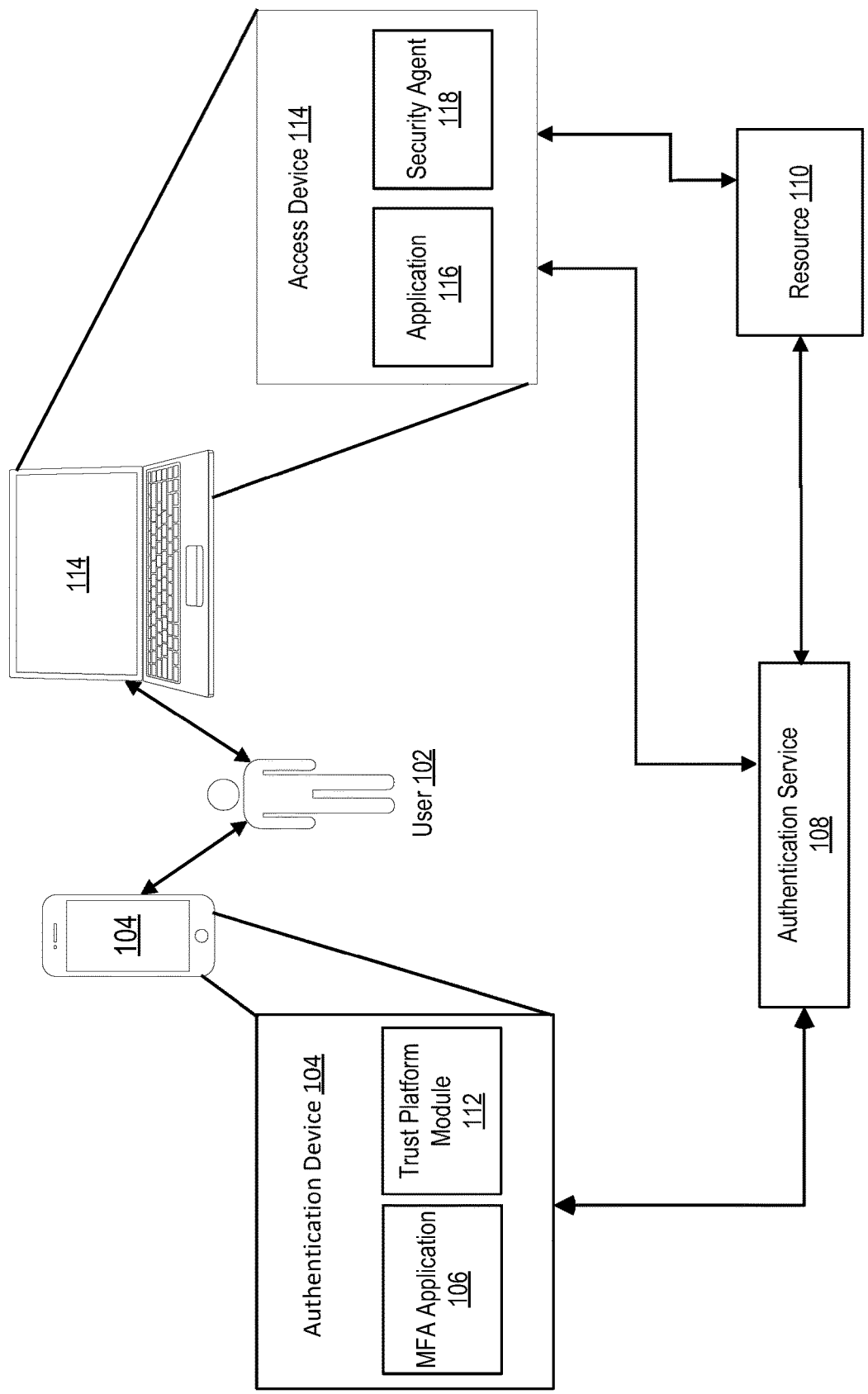
FIG. 1 illustrates an example continuous multi-factor authentication (CMFA) system in accordance with some aspects of the present technology.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

The present technology provides for altering an authentication technique in response to a detection of a possible attack to which the authentication technique is vulnerable. An authentication provider can receive an authentication request to authenticate to a first resource, where the authentication to the first resource is permitted using a particular authentication technique, including contextual information associated with the first access device and information identifying the first resource. Based on the contextual information, the authentication provider can determine that the authentication request is subject to an ongoing attack, and determine, an alternative authentication technique that is less vulnerable to the ongoing attack than the particular authentication technique. The authentication provider can require the first user account to authenticate with the first resource using the alternative authentication technique that is less vulnerable to the ongoing attack than the particular authentication technique.

The authentication service is a multi-factor authentication service and the particular authentication technique and the alternative authentication technique are multi-factor authentication techniques.

The present technology further includes presenting a user interface for a primary authentication technique to authenticate the first user account with the first resource, and after successful completion of the primary authentication technique, sending the authentication request to the authentication service, where the contextual information associated with the first access device includes one or more of data identifying a network from which the access device is connected, the IP address of the access device, a browser version used to access the first resource, an identification of browser extensions installed in the browser used to access the first resource, an operating system on the access device, and a type of access device. The authentication service can determine, based on the contextual information and the information identifying the first resource, that the particular authentication technique is permitted by a policy associated with the first resource. The authentication service can provide the particular authentication technique to the first user account, and determine that the first user account failed the particular authentication technique.

The present technology further includes setting a period in which the authentication provider will require the user account to authenticate with the first resource using the alternative authentication technique before allowing the user account to authenticate with the particular authentication technique.

In some embodiments, the first resource is associated with an access policy configured at the authentication service. The access policy specifies a rule for determining that the authentication request is subject to an ongoing attack.

In some embodiments, the service determines the characteristics associated with at least one attack are below individualized thresholds configured by the service. For example, the service might not determine an attack is occurring if a service utilizes a VPN for access devices, where the same user account may routinely attempt to authenticate from different IP addresses.

In some embodiments, the alternative authentication technique includes a multi-device push, where the multi-device push includes sending an access code to the access device for entry into the authentication device, and receiving the access code from the authentication device.

The present technology further includes prior to providing the particular authentication technique, offering options for at least two authentication techniques, where the user account selects the particular authentication technique.

In some embodiments, the present technology the determination that the first user account failed the particular authentication technique can occur prior to the determining that the authentication request is subject to an ongoing attack.

The present technology also includes an attack mitigation requirement. The attack mitigation requirement defining when the alternative authentication technique should be applied to the user account and when the alternative authentication technique should be applied to all requests for authentication to the first resource.

Other technical features may be readily apparent to one skilled in the art from the following figures, descriptions, and claims.

Detailed Description of Example Embodiments

Disclosed herein are systems and methods for identifying attacks associated with attempts to thwart multi-factor authentication (MFA) and providing alternatives to continue authentication that mitigates or removes the risk associated with the attack. The risk-based factor selection systems and methods disclosed herein use signals (e.g., a number of requests sent for authentication exceeding a threshold) from authentication attempts to determine, in real-time or close to real-time, whether the user is experiencing a certain type of attack. If so, the system may restrict the available authentication factors to only those that are known to be more secure against that specific attack.

In multi-factor authentication, when a user performs second factor authentication through a service, such as DUO or OKTA, they are often presented with a number of possible factors that they can use to authenticate their identity. These factors may include hash-based one-time password (HOTP) codes, phone calls, a push to a mobile application, web-based authentication (e.g., WebAuthN), etc. For example, a push to a mobile application, such as a push to Duo Mobile, typically includes the following steps: (1) a server receives a pre-authorization request (e.g., a user entered a password correctly, and now the server is being requested to send an MFA push); (2) the server cross-checks information to make a determination on whether the characteristics associated with the user comply with a policy (e.g., a company user policy) which allows the user to access the requested service. Such cross-checked information may include information associated with the user's IP address (e.g., their location or other geographical information), whether or not the user is on a permitted network (e.g., their home private network), browser information (e.g., browser version, what extensions are installed, etc.), the operating system (OS) type, type of computer, a unique ID of an application being accessed, the company, time of day), etc. Based on these types of information, the server decides whether the user is compliant with the policy, and then; (3) the server provides the MFA push to the user, for example, by sending to a known device registered with the user, a request for the user to acknowledge the sign-in request. This acknowledgment may be in the form of two confirmation buttons, one approving the request and one disapproving the request. It should be noted that the type of MFA provided to the user may be user selected or may be based on the policy associated with the company, service, user, other methods, or any combination thereof. If the user selects the "approve" button, the device originally seeking the connection permission is allowed to connect to the respective service.

Some of the MFA factors are more susceptible to certain attacks than others. For example, a push style authentication factor may be compromised by a "push harassment" style of attack, among others. A push harassment attack occurs when a bad actor sends pushes repeatedly to a single user, hoping to annoy them into finally approving the push. The user is inundated with push requests and may even accidentally approve the request, granting the bad actor access to the service.

To prevent a push harassment attack or other style of attack from the bad actor, the server utilizes user information (e.g., IP addresses) to identify the respective locations of the access device and the authentication device. For example, if the access device and the authentication device are in two different countries, the server can detect a potential attack and limit the affected users' factors to only non-push or "Verified Push." Verified push is a higher friction version of a mobile push experience, in which the user presented with a code on the access device and is asked to enter the code on the mobile device in order to approve the push. The code (e.g., a six-digit code) may be shown to the user in a prompt on the user's laptop when the push is initiated (or shortly thereafter). The code then must be entered along with the push approval on the authentication device, such as the user's mobile device. In this regard, the user cannot approve the push unless they are the one who triggered it, whereby the trigger came from the user's access device, such as the user's laptop, and the code is then displayed on the user's laptop with approval and entry of the code being on the user's authentication device separate from the work device.

Figure 3A:
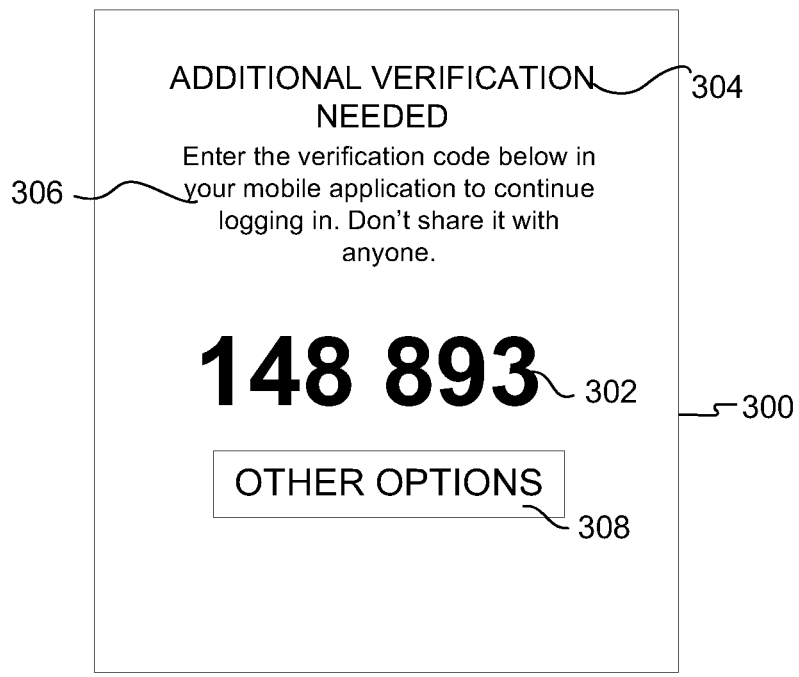
FIGS. 3A and 3B show an example of a particular authentication technique including a Verified Push in accordance with some aspects of the present technology.
Figure 3B:
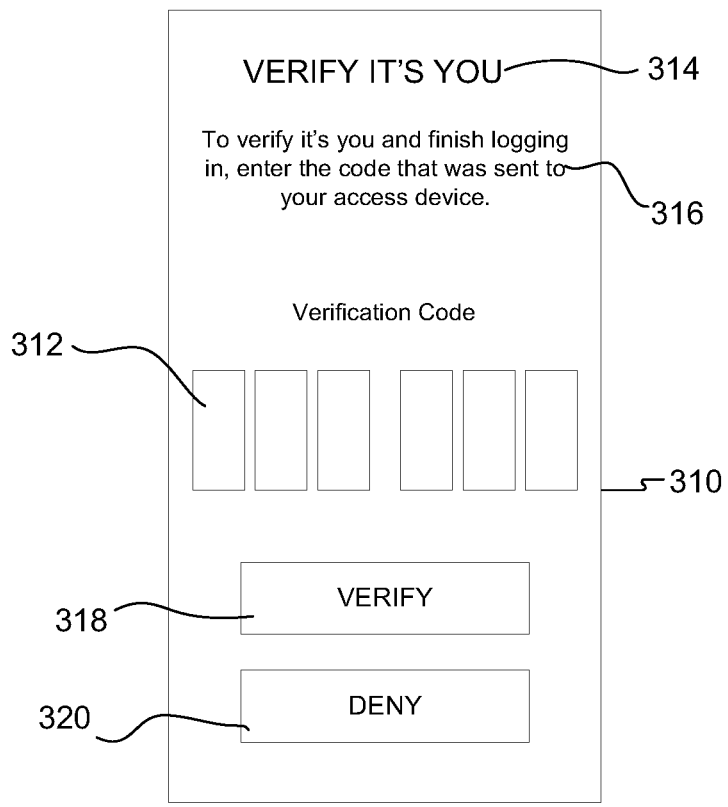

FIGS. 3A-B illustrates an example screen of the information displayed on the access device (shown in FIG. 3A) and the authorization device (shown in FIG. 3B). For example, if the system identifies (through IP address or other means) that the access device is in the United States and the authentication device is in the United Kingdom, the system may limit (e.g., based on a pre-determined policy) the affected users' factors to only non-push or Verified Push factors.

Another example of an attack that may exploit certain MFA factors is a "push spray" attack. A push spray attack occurs when a bad actor sends push authentications to many users, hoping that some of them will accept the fraudulent push. Bad actors targeting specific services may obtain large amounts of data from a data breach, including user information such as usernames and passwords. These data breaches, which are becoming increasingly prevalent, help facilitate these types of attacks. However, as previously discussed, usernames and passwords account for only one factor in multi-factor authentication. The bad actors utilize the push spray to send push authorization requests to the users identified by the data breach hoping at least one user will accept the request that allows the bad actors into the service. When the push spray attack is detected (e.g., by monitoring the number of push requests generated from a single source), the server may limit the affected users' factors to only non-push or Verified Push.

Yet another example of an attack that may exploit certain MFA factors is "Passcode Phishing" (also known as adversary-in-the-middle). Passcode phishing may occur when a bad actor sets up a fake site (e.g., a web portal mimicking the look of a real service portal site) that looks like a legitimate passcode prompt to collect passcodes from users and reuse them to gain fraudulent access. The attacker sends a user through a proxy and retrieves credentials and/or session tokens by manipulating the end user into thinking they are authenticating into a legitimate resource or application. Attackers often pose as people or organizations a user may have interacted with or that sound official, such as businesses, government organizations, and trusted service providers. These attacks are not necessarily new, but hacking tools/scripts are constantly evolving and have made it easier for attackers to execute them. Although identified methods of passcode phishing are discussed above, it should be noted that bad actors may use other methods, such as malware, virus software, ransom software, social engineering (e.g., fraudulent emails requesting information from the user or requesting password resets), combinations of the same, etc., to obtain user information in a phishing attack.

Though other types of attacks are possible, push spray, push harassment, adversary-in-the-middle, and passcode phishing attacks are common types of attacks, all of which are made more susceptible by "push fatigue." This may occur because the user is distracted or overwhelmed by constant notifications, and it may be misinterpreted as a bug or confused with other legitimate authentication requests. Repeated multi-factor authentication requests result in users paying less attention to the details of their login, causing a user to mindlessly accept a push login or pay less attention to the site they are logging into, which may be fraudulent but look very similar to the legitimate site. These attacks are all particularly effective—not because of the technology involved, but because they target the human factor via social engineering.

Identifying when these types of attacks are occurring is the first step in addressing or mitigating these attacks in order to provide heightened security to businesses looking for more security surrounding their systems. Real-time or close to real-time identification of when these types of attacks are occurring may help minimize the risks associated with the attacks. For many types of attacks, statistics, monitoring, and tracking may be used to determine or identify when the attack may be occurring. For example, in a push harassment type of attack, a single IP address associated with a bad actor may be identified as the origin IP for many authentication message requests sent to an end-user. When the system detects a certain number of requests sent from the IP address, that number may exceed a preset threshold and may signal to the system that the attack is occurring. In another example, the system may identify that an IP address not associated with a known trusted IP address is sending many requests for authentication to the end user. This unknown or untrusted IP address, coupled with the threshold for a number of requests sent being exceeded, may also be a signal to cause the system to identify that the push harassment type of attack is occurring. In yet another example signaling to the system that a push harassment type of attack is occurring, the system may identify that a single user is being sent requests for authentication originating from multiple IP addresses, and the number of requests exceeds a threshold associated with a policy set at the server.

In this regard, identification of a push harassment type of attack may be associated with a request threshold, a user, and/or an IP address wherein the system identifies that the attack is occurring based on the threshold, the user, and/or the IP address(es) associated with the requests.

In another example, a push harassment type of attack may be identified as occurring based on a number of rejected requests for authorization received at the server from an end-user. A bad actor may be sending request after request for authorization in hopes that the end-user (i.e., a trusted user associated with the right of access) may accidentally or, possibly out of frustration, accept one of the many requests sent. The end-user may reject a certain number of requests, and that number may exceed a threshold that signals to the system an attack may be occurring. In another example, the system may determine an attack is occurring based on a number of requests for authorization exceeding a threshold and the time of day. For example, a number of requests may be sent in the middle of the night by a bad actor to harass the end-user during a time when the end-user may be sleeping or otherwise not usually working in an effort to get the end-user to accept one of the requests, possibly out of frustration or confusion. Based on the time of day and the number of attacks, the system may determine that the end-user is under attack. In this regard, the system may combine other signals (e.g., time of day, unknown/untrusted IP addresses, unknown/untrusted devices, requests over a set period of time, number of rejected requests, etc.) with a threshold to identify that an attack is occurring and take steps to mitigate or address the attack.

Similar to the methods for determining a push harassment type of attack, in another example, the system may identify a push spray attack when a threshold for request authorizations is exceeded. The system may detect that a single IP address is sending requests to a number of end-users/devices associated with a particular service and the number may exceed a predefined threshold, signaling to the system that an attack is occurring. In some examples, the system may determine that a number of requests for authorization are being sent to multiple end-users of a service and that the IP address is not part of a pre-approved list of IP addresses known/trusted to send the requests. In this regard, the system may use cross-reference a list or policy to help determine whether an attack may be occurring. The system may identify that a push spray attack is occurring based on the unknown/untrusted source coupled with a number of requests exceeding a threshold. A push spray attack may be misidentified in cases where a service or company utilizes a VPN which creates the impression that a single IP address is requesting a number of authorizations wherein the number exceeds a threshold. In this case, the system may utilize the list of approved IP addresses as a tool correctly identify that the requests may be legitimate. In another example, the threshold may be adjusted (e.g., by a system administrator for the service/company) by a policy or user to allow a certain number of requests (e.g., based on a number of known end-users scheduled to work at that time) or may disable the threshold signal for that service during a period of time.

An adversary-in-the-middle or a passcode phishing attack may be identified as occurring by the system based on the IP address associated with the request or may be identified based on software (e.g., an endpoint agent on the end-user's computing device) that identifies the IP of the end-user. For example, a bad actor may set up a portal, such as a web portal, that mimics a genuine portal an end-user may utilize to sign into a service (e.g., "du0.com" with a zero instead of "duo.com" with an "o"). A user may not notice the slight difference in web addresses after accidentally typing "du0.com" which may easily occur due to the proximity of the zero key on the keyboard as compared to the "o" key. In this example, the adversary-in-the-middle may intercept the user's login password and username, communicate the information to the actual server, and relay the response to the end-user without the end-user noticing that the portal is not authentic. The bad actor may then use the phished information to request a multi-factor authentication and login as the end-user after the end-user approves the request for authentication based on their own attempt (albeit at an erroneous portal) to login. In this regard, the adversary-in-the-middle intercepts the end-user's information and uses the information along with the fact that the user is simultaneously trying to log in to trick the user into approving a request for authentication, thereby gaining unauthorized access to the service. The system may identify that the request for authorization is coming from an unknown/untrusted portal (e.g., based on the web address of the portal not being associated with a known/trusted source) and take steps to mitigate the attack. In another example, the software (e.g., the endpoint agent) may identify and notify the system that the request for authorization is coming from a suspicious source by comparing the IP address associated with the end-user to the IP address of the request's source and determining they are not the same. In another example, the software may use other information (e.g., browser information, operating system information, location, packet timing, etc.) to identify that the end-user did not make the request for authentication. In this regard, the identification of an adversary-in-the-middle or passcode phishing attack is occurring may be based on packet timing information. For example, the request for authentication may take a certain number of hops or a certain amount of time to reach the system whereas a pre-authorization may take a different amount of time to reach the system, and based on a threshold, the system may determine that the packet timing for each is too different which may signal an attack. Once the system has identified that a certain type of attack is occurring, the system can determine (e.g., based on the type of attack detected or information associated with the attack) alternate authentication factors an end-user may utilize that are less susceptible to the identified attack. In some examples, the system may present the user with a specific alternate method or factor for authentication. In other examples, the system may determine that several alternate factors are less susceptible to the type of attack occurring and may present a choice (e.g., via a pop-up message, email, or other notification) to the end-user to choose the alternate 2FA or MFA factor. For example, if the system identifies that a push spray attack may be occurring, the system may limit (e.g., based on a pre-determined policy) the affected users' factors to only non-push or Verified Push factors. In this regard, the user may have to authenticate using non-push methods (e.g., WebAuthN, YubiKey, biometrics, passcodes, HOTP codes, tokens, SMS codes, hardware dongle, etc.) that are less susceptible to push spray attacks. In another example, if the system identifies that a push harassment type of attack may be occurring, the system may disallow push factors or may switch to a "pushless push" (e.g., use the end-user's mobile device to authenticate but not trigger a push notification for it). In another example, if the system identifies a passcode phishing or adversary-in-the-middle attack, the system may temporarily block the passcode as an available authentication factor. With any type of attack having been identified, the system may determine that a threshold update is required. In this regard, the system may adjust the thresholds or may prompt a company/service administrator to update the thresholds based on any number of metrics including frequency of attacks, number of falsely identified attacks, time periods, etc. It should be noted that the system may use artificial intelligence (AI) software to track and determine thresholds in various possible examples.

In some examples, the list of alternate, less susceptible factors may be determined by a rule or policy associated with the type of attack, company, and/or the type of service. In other examples, a company/service administrator may decide on acceptable alternate, less susceptible methods for the end-user to continue authentication. In this regard, the alternate, less susceptible factors may be configurable and may be specific to each company/service. In one example, the alternate, less susceptible factors may be end-user specific or may pertain to certain groups of end-users.

In some examples, after the system has determined that a specific type of attack is or is potentially occurring, and after the system adjusts the allowed MFA factors to those less susceptible to that type of attack and the end-user successfully authenticates using one of the identified less susceptible factors, the system may allow all previous MFA factors for that company/service. In some examples, the system may determine (e.g., based on a previous successful authentication) that all previously allowed MFA factors are acceptable authentication factors. In some examples, after a period of time (e.g., a predetermined timeout period) the system may determine that or may determine that only certain previously allowed factors are acceptable authentication factors. In this regard, the system may track unsuccessful attempts and successful attempts, may track time periods between attempts, and may base the list of allowed MFA factors on the number of failed or successful attempts and/or a time associated with the attempts in various possible examples. It should be noted that the system may also determine the allowed list of MFA factors based on a rule or policy, configurable rule or policy, feedback from a company/service, etc., and combinations of the same in various possible examples.

FIG. 1 illustrates an example environment utilizing a multi-factor authentication (MFA) system in accordance with some aspects of the present technology. User 102 can gain authorized access to resource 110 by using authentication device 104. User 102 can be any user including an employee, contractor, client, member of an organization, or private individual, etc. attempting to access a service. The authentication device 104 can be hardware, software-only, or combinations thereof. The authentication device 104 can be a mobile device or a personal computer.

Resource 110 can be any service, resource, device, or entity which requires authentication of user 102. For example, resource 110 can be a social media service, bank, hospital, motor vehicle department, bar, voting system, Internet of Things (IOT) device, or access device. In some embodiments, resource 110 can be accessed by user 102 through an access device 114, such as a mobile phone or personal computer. In some embodiments, resource 110 can be accessed by user 102 through an application 116 on an access device 114 that is specifically designed for accessing resource 110, or through a more general application 116 that can access multiple services, such as a web browser, or portions of an operating system. In some embodiments, resource 110 can be a plurality of resources, such as a network or enterprise system.

Resource 110 can authenticate the identity of user 102 on its own through the use of an authentication mechanism, and can utilize the authentication service 108 to provide an additional factor of authentication. For example, user 102 can attempt to access the resource 110 using the access device 114. In some embodiments, the access device 114 can also be the authentication device 104, such as when user 102 attempts to access the resource 110 using an app or browser on authentication device 104. The resource 110 can perform a first authentication mechanism by interacting with the access device 114. Thereafter, the resource 110 can request an additional authentication using authentication device 104.

In some embodiments, the additional authentication can include requesting a code generated by the authentication device 104. For example, the MFA application 106 might generate a pseudo-random number using a mechanism agreed upon with resource 110. The user 102 can operate the authentication device 104 to cause the MFA application 106 to generate the pseudo-random number, which the user 102 can then enter into the access device 114 to achieve the additional authentication. In some embodiments, if the authentication device 104 is equipped with a trust platform module 112, the MFA application 106 can utilize the trust platform module 112 to generate the pseudo-random number.

In some embodiments, the additional authentication can include requesting a code or authorization generated by the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. The user can respond to the request for authentication on the authentication device 104 by interacting with the MFA application 106 to perform the required actions. When the required actions are properly performed, the MFA application 106 can send a communication informing the authentication service 108 of the successful authentication, and the authentication service 108 can inform the resource 110 of the successful authentication.

In some embodiments, the additional authentication can include requesting a code generated at resource 110 to be entered at the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. In this example, the MFA application 106 presents a user interface requesting that the user 102 enter a code that is presented on the access device 114 that originated from the resource 110. The user can respond to the request for authentication on the authentication device 104 by interacting with the MFA application 106 to perform the required action by entering the code. When the code is properly entered, the MFA application 106 can send a communication informing the authentication service 108 of the code, and the authentication service 108 can pass the code to the resource 110 where the resource 110 will consider the additional authentication successful when the received code matches the code sent to the access device 114.

In some embodiments, the authentication device 104 and/or the access device 114 can also report context data to the authentication service 108. As addressed above the authentication device 104 can include the MFA application 106 that can communicate with the authentication service 108. The access device 114 can include a security agent 118 that can also communicate with the authentication service 108. The MFA application 106 and the security agent 118 can gather and send information to the authentication service 108. For example, the information can include biometric, behavioral, and contextual data from user 102. These biometrics can include, for example, fingerprints, facial detection, retinal scans, voice identification, or gait data, among other biometrics. The context data can include a time since the user last interacted with the device, changes to the network connection experienced by the device, information about the integrity of the operating system of the device, information about what operating system and what version of the operating system the device is running, among other examples. This information can be used by the authentication service 108 to determine if the device should be trusted to be used as part of the authentication process or trusted to access the resource 110. In some instances, the information can indicate that something has changed about the user 102, the authentication device 104, or the access device 114 during an authenticated session with resource 110 can take certain actions depending on a configured policy to access the resource 110.

Figure 2A:
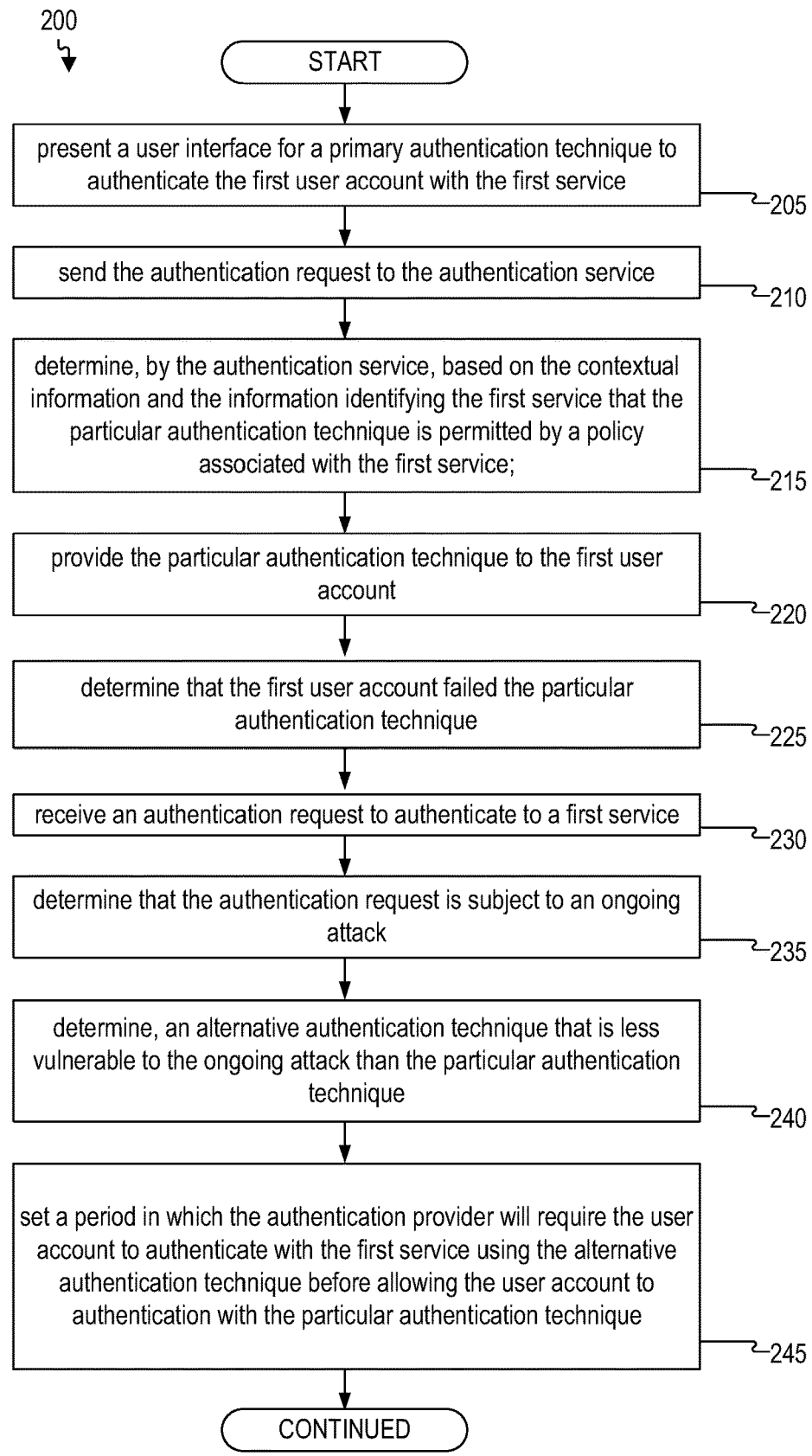
FIGS. 2A and 2B illustrate an example method in accordance with some aspects of the present technology.
Figure 2B:
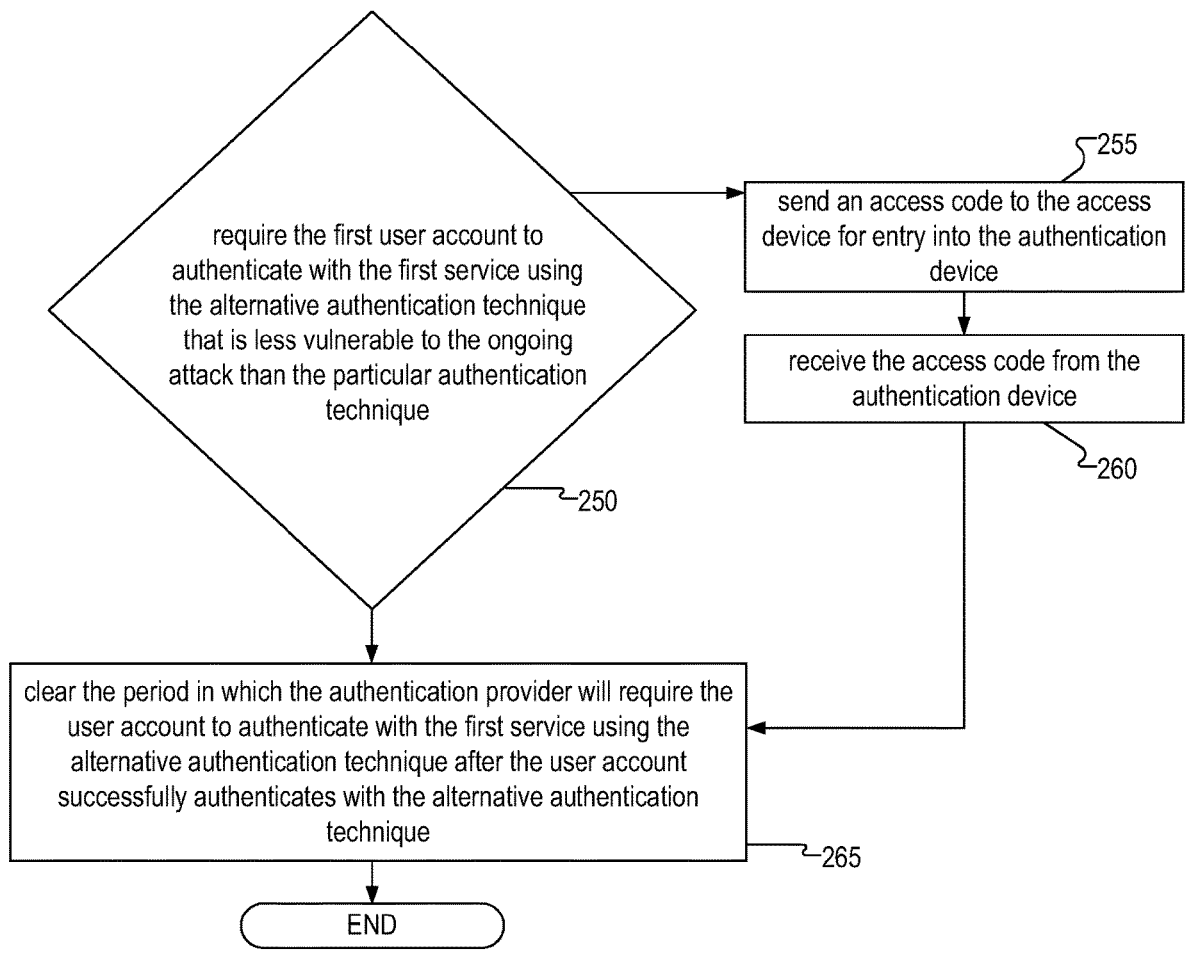

FIGS. 2A-B illustrates an example method 200 for risk-based factor selection wherein the method includes various aspects of the disclosure as they relate to receiving a pre-authorization, identifying a certain type of attack, adjusting available MFA factors, presenting the factors to the user, and allowing or denying authorization. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes presenting a user interface for a primary authentication technique to authenticate the first user account with the resource at block 205. For example, the access device 114, illustrated in FIG. 1, may present a user interface for a primary authentication technique to authenticate the first user account with the resource (i.e, resource 110), such as through an application installed on the user's 102 laptop (i.e., access device 114). As previously discussed, access device 114 may include hardware (e.g., a computer), software (e.g., a browser extension), a website (e.g., a web portal) hosted on a separate computing device, or any other application of the device capable of presenting the interface for a primary authentication technique. In some examples, the primary authentication technique is a username and password. In some examples, the primary authentication technique may be any authentication technique capable of verifying the user's 102 information. It should be noted that presenting a user interface for a primary authentication technique may have been initiated by a bad actor as part of an initial step in gaining access to a resource 110. In some examples, a legitimate user 102 may have requested the primary authentication technique while a bad actor is inconspicuously monitoring the legitimate user, such as in an adversary-in-the-middle attack. In this regard, the primary authentication technique may be presented based on a legitimate request, an illegitimate request, or simultaneous legitimate and illegitimate requests.

According to some examples, the method includes sending the authentication request to the authentication service at block 210. For example, the resource 110 may send the authentication request to the authentication service 108. In some examples, the authentication service is a multi-factor authentication service. In some examples, the authentication service is a two-factor authentication service. In this regard, the authentication service may require one or more factors to authenticate the user in various possible examples. In some examples, the authentication request includes contextual information associated with the access device 114 of the request and information identifying the resource 110. The authentication request may include contextual information associated with the request and/or the user 102 including the IP address of the access device, a browser version, an identification of browser extensions, an operating system on the access device, a type of access device, time of day, geographical information, combinations of the same, etc., in various possible examples. In some examples, the contextual information associated with the access device 114, authentication device 104, and/or user 102 includes one or more of data identifying a network from which the access device or authentication device is connected. In some examples, the request or contextual information includes information about the user, such as a name or username, password, user ID, combinations of the same, etc., in various possible examples.

According to some examples, the method 200 includes determining, by the authentication service and/or authentication device, based on the contextual information and the information identifying the resource that the particular authentication technique is permitted by a policy associated with the resource at block 215. For example, the authentication service 108 illustrated in FIG. 1 may determine, based on the contextual information and the information identifying the resource 110, that the particular authentication technique is permitted by a policy associated with the resource 110. In some examples, the authentication service 108 may set the policy associated with the resource 110. In some examples, the policy may be set by the resource 110. In some examples, the policy may be set by an administrator or user of the resource 110. It should be noted that the policy associated with the particular authentication technique may be updated, adjusted, changed, or otherwise set for each user 102 or user account, groups of users or accounts, resource 110, particular authentication technique, authentication device 104, authentication session, combinations of the same, etc., in various possible examples.

Further, the method 200 may determine that the contextual information, such as from the access device, is only allowed to utilize a subset of available authentication techniques (e.g., two of five available authentication techniques) associated with the resource, authentication service, and/or policy. For example, the contextual information may include information that the user 102 is on a public network (e.g., accessing the internet on a laptop in a coffee shop), and the authentication provider 108 may determine (e.g., based on the policy and the contextual information) that the user 102 may only utilize a push type authentication method, biometric authentication method, or Verified Push type authentication method. In this regard, the authentication provider 108 and/or authentication device 104 may consider contextual information associated with the request and/or the user 102 to indicate a higher risk associated with allowing the user to use particular authentication techniques.

According to some examples, the method includes providing the particular authentication technique to the first user account at block 220. For example, the authentication device 104 may provide the particular authentication technique to the first user account via a website or web portal, application, email, pop-up extension, notification (e.g., email), computing device, hardware device (e.g., a fingerprint reader), combinations of the same, etc., in various possible examples. In some examples, the authentication service 108 or the resource 110 may provide the particular authentication technique to the user via the authentication device 104 or the access device 114.

In some examples, the user 102 may be offered options for at least two authentication techniques. For example, authentication provider 108 or authentication device 104 may offer the user the option to select between a "push" (e.g., a pop-up on the user's mobile device, or access device) or a one-time passcode (OTP) (e.g., sent via email to the user account associated with the access request). In some examples, the options associated with the available authentication techniques may be based on the policy associated with the resource 110 or authentication service 108. In some examples, the options associated with the available authentication techniques may be based on the user account, type of device requesting the access, contextual information associated with the request, data including previous requests or other historical information, a current network or threat level assessment, geographical information, combinations of the same, etc., in various possible examples. In some examples, the user associated with the user account selects the particular authentication technique.

According to some examples, the method includes determining that the first user account failed the particular authentication technique at block 225. For example, the authentication device 104 or the authentication service 108 may determine that the first user account failed the particular authentication technique. In some examples, determining that the user account failed may be based on a received "deny" indication, such as a response to a push authentication request presented on the authentication device 104. In some examples, determining that the user account failed the particular authentication technique includes, the identification of an invalid password, invalid passcode, invalid biometric indicator, invalid hash, invalid decryption, combinations of the same, etc., in various possible examples. In this regard, determining the user account failed the particular authentication technique may be determined by the authentication device 104, authentication service 108, resource 110, combinations of the same, or other trusted sources in various possible examples.

According to some examples, the method includes receiving an authentication request to authenticate to a resource, at block 230. For example, a bad actor using an ill gotten (e.g., obtained from malware, purchased on a black market, intercepted from a message, etc.) primary authentication technique (e.g., a genuine username and password) associated with a legitimate user account may initiate an authentication request to authenticate to a resource in hopes that the legitimate user will approve the request once it is generated from the authentication service 108, authentication device 104, and/or the resource 110 thereby allowing the bad actor access to the resource 110. In some examples, the bad actor may initiate one or more requests. In some examples, the bad actor may initiate many requests for authentication to the resource (e.g., a push spray attack) at the same time, or may initiate the requests one after another over a period of time (e.g., a push harassment attack). In some examples, a legitimate user 102 may have requested the primary authentication technique while a bad actor is inconspicuously monitoring the legitimate user, such as in an adversary-in-the-middle attack or a passcode phishing attack. In some examples, the bad actor and the user 102 may have initiated the request to authenticate to a resource at the same time or within a short period of time (e.g., within 10 minutes of each other). In this regard, the received request to authenticate to a resource may be a legitimate request or may be an illegitimate request.

According to some examples, the method includes determining that the authentication request is subject to an ongoing attack at block 235. For example, the authentication device 104, trusted provider 108, and/or resource 110 may determine that the authentication request is subject to an ongoing attack. The determination may be based on an identification that the request is originating from a source IP or device not associated with the user 102. The determination may also be based on the location of the source IP or device. In some examples, the determination may be based on information tracked over a period of time, such as a number of received authentication requests over a period of time (e.g., 20 requests in 5 minutes) or at a specific time (e.g., requests made in the middle of the night). The tracked information, such as the number of requests, may exceed a preset threshold (e.g., a preset threshold set by a policy, an administrator, the resource, the authentication service, etc.). In this regard, the threshold used in determining that the authentication request is subject to an ongoing attack may be changed or adjusted based on the user 102, user group, service, policy or rule, access device, combinations of the same, etc., in various possible examples. The time-out of the push requests indicates a push fatigue attack. In some examples, the authentication service 108 may determine that the user account is under attack when greater than a threshold number of push requests sent by the authentication service have timed-out. In some examples, the time-out of the push requests may indicate a push fatigue attack or a push harassment attack. The authentication service 108 may determine that the user account is under attack when greater than a threshold number of requests sent by the authentication service 108 have been declined by user 102 which may indicate the attack is a brute force attack. It should be noted that it may be determined the resource is under attack when the threshold is exceeded by a metric associated with the request, user, service, combinations of the same, etc., in various possible examples. In some examples, a number of authentication requests received by the authentication service 108 that originate from an IP address but are requested on behalf of different user accounts may indicate that a certain type of attack is occurring. In some examples, the authentication request received by the authentication service 108 originates in a country that differs from the location of the authentication device 104, indicating a potential attack from a bad actor. In some examples, a rule or policy may define that the user account may be under attack when the user account is attempting to authenticate from an IP address not previously associated with the user account. In some examples, the authentication service 108 may see the characteristics associated with some attacks as normal, below an individualized threshold, such as if the provider/service (e.g., resource 110) utilizes a VPN for access devices. The user 102 may routinely attempt to authenticate from different IP addresses within a range of addresses associated with the VPN, and this would be normal i.e., within a threshold configured by the service where the service knows the range of possible addresses. In this regard, the access policy may specify a rule for determining that the authentication request is subject to an ongoing attack in various possible examples.

In some examples, the access policy is defined by the resource and may be based on the contextual information. In some examples, determining that the first user 102 account failed the particular authentication technique occurs prior to the determining that the authentication request is subject to an ongoing attack. It should be noted that user 102 may determine the authentication request is subject to an ongoing attack in various possible examples. In this regard, the user 102 may report to the authentication provider 108 (e.g., via a report malicious activity button, via the authentication device 104, or access device, etc.) It should be noted that although specific types of attacks are discussed, any number of attacks, known or unknown, may be detected by the systems and methods disclosed herein in various possible examples.

According to some examples, the method includes determining, an alternative authentication technique that is less vulnerable to the ongoing attack than the particular authentication technique at block 240. In some examples, the authentication service 108 may determine the alternative authentication technique that is less vulnerable to the ongoing attack. In some examples, the authentication device 104 or resource 110 may determine an alternative authentication technique that is less vulnerable to the ongoing attack. In some examples, the user 102 or an administrator may determine the alternative authentication technique. The determination may be based on the contextual information, the user 102, user group, the resource 110, the access device, a policy or rule, combinations of the same, etc., in various possible examples. In some examples, the determination may be based on the primary authentication technique and the associated contextual information. For example, the primary authentication technique may be a mobile push, such as a push to verify, sent to a mobile device. The bad actor may be initiating repeated requests for the mobile pushes and may be initiating the repeated requests during a time when the user 102 is sleeping, such as in the middle of the night, during a push harassment attack. In this regard, the bad actor may be trying to get the user 102 to exhaustedly, or otherwise out of frustration, accept one of the repeated mobile pushes. After the system determines that the primary authentication technique (i.e., the mobile pushes) is subject to the ongoing attack, the system may determine that a Verified Push (described below with respect to FIGS. 3A-3B) is less vulnerable to this type of attack because the user 102 may not simply approve the request via the mobile push. In this regard, the alternative authentication technique may include a multi-device push, a YubiKey, biometric, passcode, HOTP, OTP, phone call, combinations of the same, etc., or an authentication using another trusted service or technique, such a WEBAUTH or WEBAUTHN, in various possible examples. In some examples, the access policy includes an attack mitigation requirement, the attack mitigation requirement defining when the alternative authentication technique should be applied to the user account, group of user accounts, or when the alternative authentication technique should be applied to all requests for authentication to the resource. It should be noted that the systems and methods described herein may be applied to a resource, a second service, multiple services, may be applied to a resource and then changed, combinations of the same, etc., in various possible examples. In this regard, when the alternate authentication technique is applied and/or how often it is applied may be configurable or may be set by the authentication service 108.

In some examples, the method includes setting a period in which the authentication provider 108 will require the user 102 account to authenticate with the resource, such as resource 110, using the alternative authentication technique before allowing the user 102 account to authenticate with the particular authentication technique at block 245. In this regard, the period may be set to mitigate the risk of an ongoing attack thereby reducing the chances that a bad actor gains access to the resource 110. In some examples, the period may be set by the authentication service or may be set by the policy associated with the resource. In some examples, the policy may be set by the resource 110. In some examples, the policy may be set by an administrator or user of the resource 110. It should be noted that the period associated with the particular authentication technique may be updated, adjusted, changed, or otherwise set for each user 102 or user account, groups of users or accounts, resource 110, particular authentication technique, authentication device 104, authentication session, combinations of the same, etc., in various possible examples.

Continuing example method 200 and shown in FIG. 2B, the method includes requiring the first user 102 account to authenticate with the resource, such as resource 110, using the alternative authentication technique that is less vulnerable to the ongoing attack than the particular authentication technique at block 250. In this regard, the user 102 may not use any authentication technique available and may only use the alternate technique, or choose between a list of alternate techniques, set by the authentication service 108, rule or policy, resource 110, administrator, combinations of the same, etc., in various possible examples. Restricting the techniques may help mitigate the risks associated with an ongoing attack while still allowing the user 102 to be authenticated thereby facilitating the user's 102 ability to continue working.

According to some examples, the method includes sending an access code to the access device for entry into the authentication device at block 255 in addition to requiring the first user to authenticate with the resource using the alternate authentication technique like in step 250. In some examples, the authentication service 108, authentication device 104, and/or resource 110 may require authenticating at least two MFA factors after the user 102 provides the primary authentication to mitigate the risk associated with the ongoing attack and allow the user 102 to utilize resource 110. In this regard, the method includes receiving the access code from the authentication device at block 260 for authentication verification at the authentication service 108, authentication device 104, and/or resource 110. Although not shown, method 200 may repeat any step, combine steps, skip steps, iterate steps, combinations of the same, etc., in various possible examples.

According to some examples, the method includes clearing the period in which the authentication provider 108 will require the user 102 account to authenticate with the resource 110 using the alternative authentication technique after the user account successfully authenticates with the alternative authentication technique at block 265. In this regard, once the system determines the risk of an ongoing attack have been mitigated or are otherwise no longer present (e.g., by a successful user MFA authentication), the system may revert back to the default configuration or otherwise allow more or all of the available authentication techniques. In some examples, the authentication service 108, authentication device 104, and/or resource 110 may determine when to clear the period. In some examples, a rule or policy associated with the authentication service 108, authentication device 104, and/or resource 110 may determine when to clear the period. It should be noted that the period may be configured, such as by a resource administrator or authentication service administrator.

FIGS. 3A-B show an example of a particular authentication technique including a Verified Push, which may be an alternative authentication technique. It should be noted that the Verified Push may be a primary authentication technique or an alternative authentication technique. Verified Push is a higher friction version of a mobile push, in which the user may be asked to enter a code on an authentication device 104 or another authentication device, such as a mobile device, in order to approve the push. As shown in FIG. 3A, the user 102 may be presented with a code 302, such as a six-digit code. It should be noted that the code 302 may be any suitable length including numbers, letters, symbols or pictures, and combinations thereof in various possible examples. The code 302 may be shown in a prompt 300, and the prompt may be presented on the user's 102 access device 114, such as a laptop, when the push is initiated (or shortly thereafter). In this regard, the user 102 may not approve the push unless they are actually the one who triggered it, i.e., the code is on the device that triggered the request. Shown in FIG. 3A, the prompt may include a header 304 indicating what is needed, such as additional verification. Message 306 may be shown to aid the user 102 in completing the authentication verification, such as with instructions on how to complete the authentication. In some examples, the user 102 may be presented with an alternative options button 308, which may include alternate authentication techniques available to the user 102. It should be noted that the alternate techniques available to the user 102 through the alternate options button 308 may be determined by the authentication service 108, a rule or policy associated with the resource 110, user 102, group of users, combinations of the same, etc., in various possible examples. The length of the code may be configurable. For example, more digits may provide a stronger security guarantee because an attacker only has a 1-in-1,000,000 chance of guessing a 6-digit code correctly, versus a 1-in-100 chance with a shorter code, such as a 2-digit code. It should be noted that a Verified Push may be triggered adaptively such as when the user 102 appears to be involved in a push fraud attack. In this regard, coupling Verified Push with the Risk-Based Factor Selection systems and methods of the present disclosure may help maintain a high security interaction and only be required when it is determined to be necessary, such as by the resource 110 or authentication service 108.

FIG. 3B shows an example verification interface 310 for inputting the code 302 that may be presented to the user's 102 authentication device 104, such as a mobile device. The verification interface 310 may include a header 314 indicating to the user 102 what the purpose of the interface may be, such as Verify It's You. The verification interface 310 may include a message 316 that aids the user 102 in completing verification. The code 302 may be entered into the code verification boxes 312. In some examples, the user 102 may then choose to verify the code by pressing a verify button 318. In some examples, the user 102 may not need to press a verify button 318 and the code 302 may automatically be authenticated when entered. In some examples, the user 102 may choose to deny the authentication by pressing a deny button 320. In this regard, the user 102 may deny the verification because they did not request the code, which may indicate to the authentication service 108, resource 110, or MFA 104 that an attack may be occurring.

Figure 4:
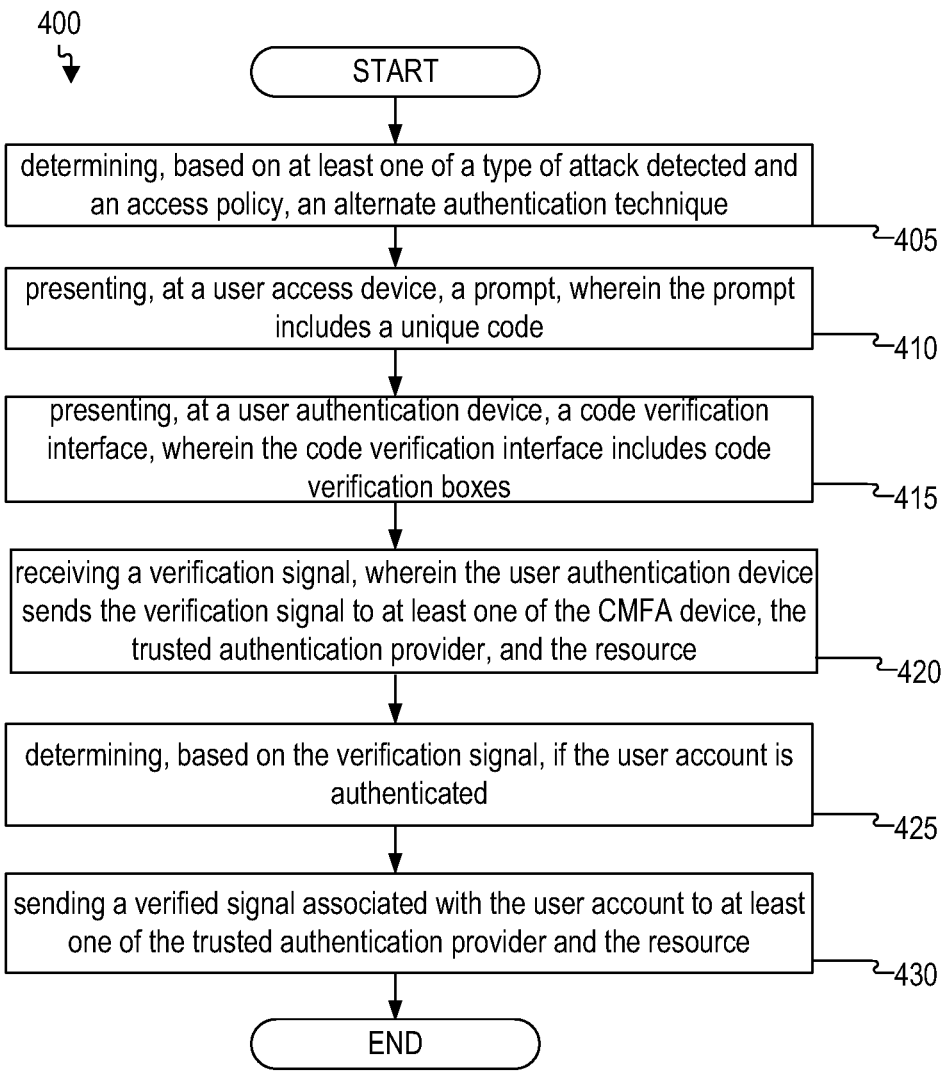
FIG. 4 illustrates an example method of authenticating a user with a Verified Push in accordance with some aspects of the present technology.

FIG. 4 shows an example method 400 of the particular authentication technique including a Verified Push, which may be an alternative authentication technique. According to some examples, the method includes determining, based on at least one of a type of attack detected and an access policy, an alternate authentication technique at step 405. In some examples a Verified Push may be used as the alternative authentication technique if a push spray attack, push fatigue attack, push harassment attack, other types of attacks, combinations of the same, the access device 114 and authentication device 104 are located in different countries, etc., is detected. In some examples, the access policy associated with the resource 110 may specify or be configured to specify which type of attack a Verified push may be used as an alternative authentication technique.

According to some examples, the method 400 includes presenting, at a user access device, a prompt, wherein the prompt includes a unique code at step 410. With reference to FIG. 3A, the user 102 may be presented with a code 302, such as a six-digit code in various possible examples. The code 302 may be shown in a prompt 300, and the prompt may be presented on the user's 102 access device, such as a laptop, when the push is initiated (or shortly thereafter). It should be noted that the verification prompt 300 may be any type of communication, for example, prompt 300 may be an email, a phone call, a picture, a text message, a generated user interface (GUI), combinations of the same, etc., in various possible examples.

According to some examples, the method 400 includes presenting, at a user authentication device, a verification interface, wherein the verification interface includes a code input box at step 415. With reference to FIG. 3B, an example prompt 310 for inputting the code 302 that may be presented to the user's 102 authentication device, such as a mobile device, is shown. It should be noted that the verification interface may be presented on the access device in various possible examples. In some examples, the authentication device and the access device may be the same device. The code 302 may be entered into the code verification boxes 312. As previously discussed, the verification boxes 312 may be one or more input boxes capable of receiving the code 302.

According to some examples, the method 400 includes receiving a verification signal, wherein the user authentication device sends the verification signal to at least one of the authentication device, the authentication service, and the resource at step 420. It should be noted that the authentication device may be authentication device 104 and may be part of either the authentication service 108, the user access device, the user authentication device, and/or the resource 110. In some examples, the verification signal may be received from a $3^{rd}$ party service.

According to some examples, the method 400 includes determining, based on the verification signal, if the user account is authenticated at step 425. In some examples the authentication device 104 may determine that the verification signal is authenticated. In some examples, the authentication service 108 and/or resource 110 may determine that the verification signal is authenticated.

According to some examples, the method 400 includes sending a verified signal associated with the user account to at least one of the authentication service and the resource at step 430. It some examples, the verified signal may be sent to both the authentication service 108 and the resource 110. In some examples, the verified signal is sent to the user access device. In some examples, the authentication service 108 and/or the resource 110 may clear or otherwise reset a period in which the authentication provider will require the user account to authenticate with the resource using the alternative authentication technique, such as Verified Push, after the verified signal is sent. In this regard, the user 102 account may be verified and allowed to access the resource 110 after the verified signal is sent.

Figure 5:
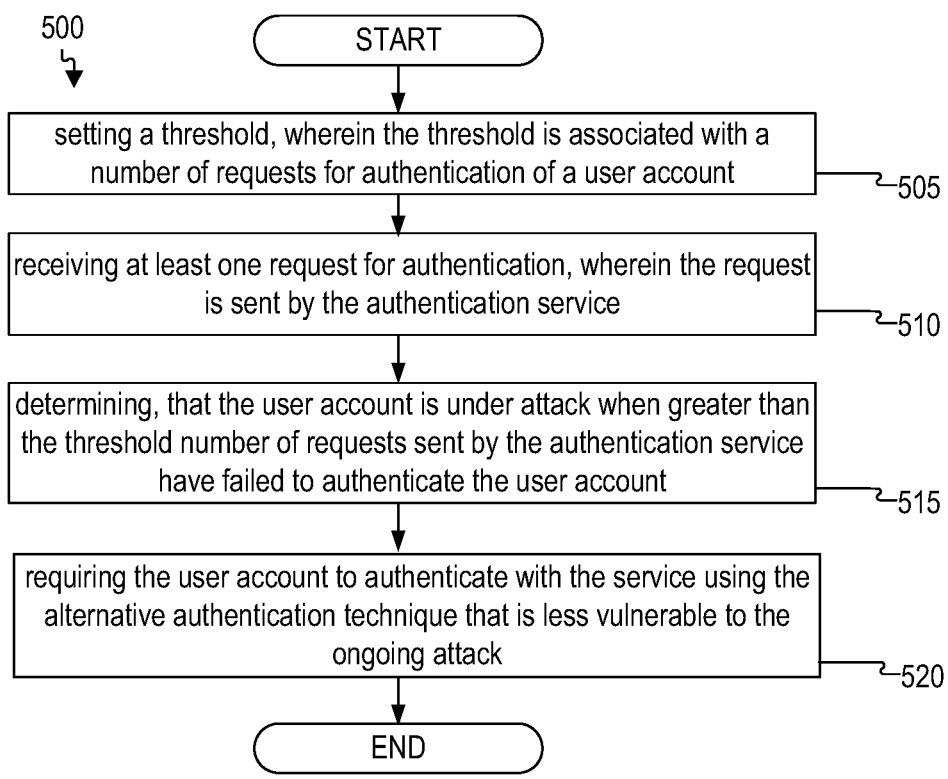
FIG. 5 illustrates an example method for detecting that a user account may be subject to an attack and requiring the user account to log in with an alternate authentication procedure in accordance with some aspects of the present technology including a threshold.

FIG. 5 shows an example method 500 of one aspect of the present disclosure. According to some examples, the method 500 includes setting a threshold, wherein the threshold is associated with a number of requests for authentication of a user account at step 505. In some examples, the authentication service 108 sets the threshold. In some examples, the resource 110 sets the threshold. In some examples, the threshold is set by a service administrator or an authentication provider administrator. In this regard, the threshold may be configurable and may be set according to a particular authentication technique.

According to some examples, the method 500 includes receiving at least one request for authentication, wherein the request is sent by the authentication service at step 510. In some examples, any number of requests associated with the user 102 account may be received. The number of requests received may be tracked by the authentication device 104, the authentication service 108, the resource 110, combinations of the same, etc., in various possible examples.

Figure 6:
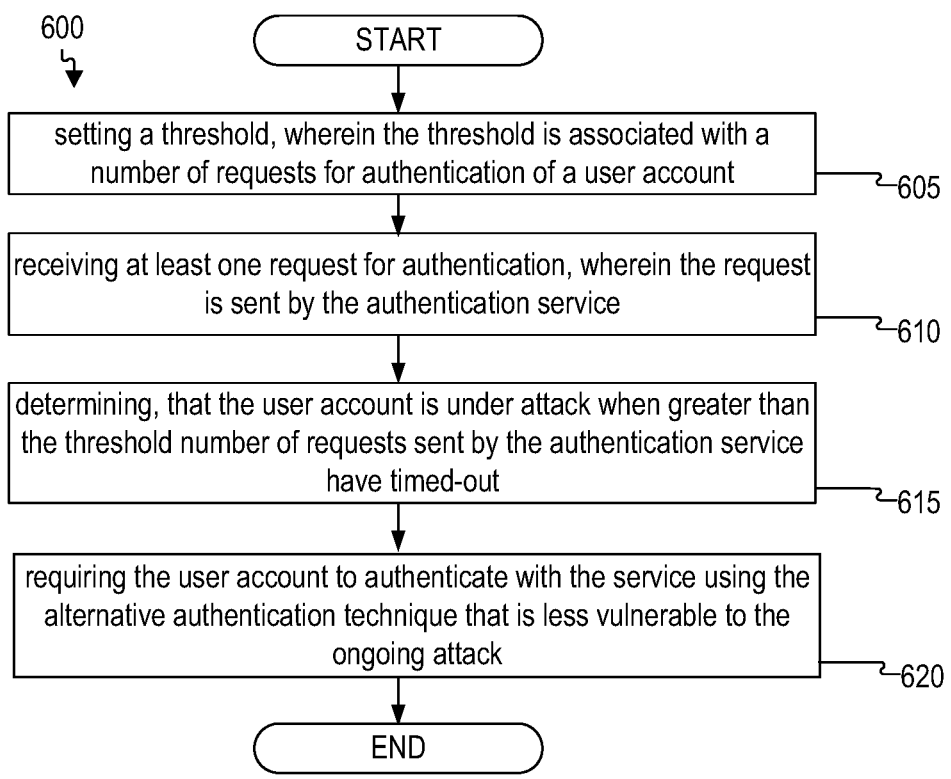
FIG. 6 illustrates an example method for detecting that a user account may be subject to an attack and requiring the user account to log in with an alternate authentication procedure in accordance with some aspects of the present technology including a threshold.

According to some examples, the method 500 includes determining, that the user account is under attack when greater than the threshold number of requests sent by the authentication service have failed to authenticate the user account at step 515. In some examples, the system may determine that the user 102 account has denied a number of requests greater than the threshold. In some examples, authentication device 104 may determine that the particular authentication technique has failed verification and may provide the system, such as the authentication service 108 and/or resource 110, a signal including the number of failed requests. In some examples, (as shown in FIG. 6 at step 615) the system may determine that a number of requests greater than the threshold have timed out, i.e., the user 102 account has neither tried to verify nor deny the requests. It should be noted that the number of failed requests may be a combination of any failed, or timed-out, authentication technique associated with the user 102 account.

According to some examples, the method 500 includes requiring the user account to authenticate with the service using the alternative authentication technique that is less vulnerable to the ongoing attack at step 520. In this regard, the user 102 account may not use any authentication technique available and may only use the alternate technique, or a choose between a list of alternate techniques, set by the authentication service 108, rule or policy, resource 110, administrator, combinations of the same, etc., in various possible examples. Restricting the techniques may help mitigate the risks associated with an ongoing attack while still allowing the user 102 account to be authenticated thereby facilitating the user's 102 ability to continue working.

Figure 7:
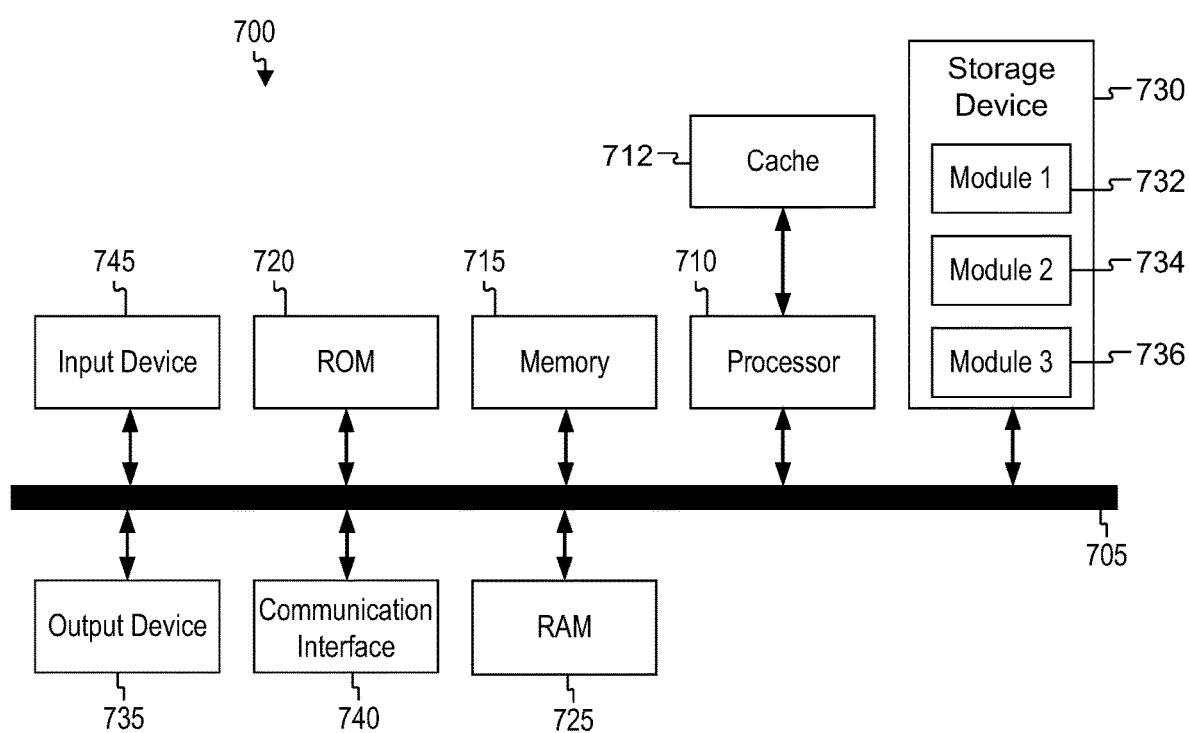
FIG. 7 shows an example of computing system 700, which can be, for example, any computing device that can implement components of the system described herein.

FIG. 7 shows an example of computing system 700, which can be for example any computing device making up the access device 114, authentication device 104, authentication service 108, resource 110, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for altering an authentication technique in response to a detection of a possible attack to which the authentication technique is vulnerable, the method comprising: receiving an authentication request to authenticate to a resource, wherein the authentication to the resource is permitted using a particular authentication technique, wherein the authentication request includes contextual information associated with the first access device of the request and information identifying the resource; based on the contextual information, determining that the authentication request is subject to an ongoing attack; determining that the authentication request is subject to an ongoing attack; determining, an alternative authentication technique that is less vulnerable to the ongoing attack than the particular authentication technique; and an alternative authentication technique that is less vulnerable to the ongoing attack than the particular authentication technique; and requiring the first user account to authenticate with the resource using the alternative authentication technique that is less vulnerable to the ongoing attack than the particular authentication technique.

Aspect 2. The method of Aspect 1, wherein the authentication service is a multi-factor authentication service, and the particular authentication technique a multi-factor authentication technique, and the alternative authentication technique is an alternative multi-factor authentication technique.

Aspect 3. The method any of Aspects 1 to 2, wherein the authentication request is received after the first user account has completed a primary authentication technique on the first access device.

Aspect 4. The method of any Aspects 1 to 3, wherein the primary authentication technique is a username and password combination.

Aspect 5. The method of any of Aspects 1 to 4, further comprising: presenting a user interface for a primary authentication technique to authenticate the first user account with the resource; by the access device, a user interface for a primary authentication technique to authenticate the first user account with the resource; after successful completion of the primary authentication technique, sending the authentication request to the authentication service, wherein the contextual information associated with the first access device includes one or more of data identifying a network from which the access device is connected, the IP address of the access device, a browser version used to access the resource, an identification of browser extensions installed in the browser used to access the resource, an operating system on the access device, and a type of access device; determining, by the authentication service, based on the contextual information and the information identifying the resource that the particular authentication technique is permitted by a policy associated with the resource; and by the authentication service, based on the contextual information and the information identifying the resource that the particular authentication technique is permitted by a policy associated with the resource; and providing the particular authentication technique to the first user account; determining that the first user account failed the particular authentication technique.

Aspect 6. The method of any of Aspects 1 to 5, further comprising: prior to providing the particular authentication technique, offering options for at least two authentication techniques, wherein offering options for at least two authentication techniques, wherein the user account selects the particular authentication technique.

Aspect 7. The method of any of Aspects 1 to 6, wherein the determining that the first user account failed the particular authentication technique occurs prior to the determining that the authentication request is subject to an ongoing attack.

Aspect 8. The method of any of Aspects 1 to 7, further comprising: setting a period in which the authentication provider will require the user account to authenticate with the resource using the alternative authentication technique before allowing the user account to authentication with the particular authentication technique.

Aspect 9. The method of any of Aspects 1 to 8, further comprising: clearing the period in which the authentication provider will require the user account to authenticate with the resource using the alternative authentication technique after the user account successfully authenticates with the alternative authentication technique.

Aspect 10. The method of any of Aspects 1 to 9, wherein the resource is associated with an access policy configured at the authentication service, the access policy specifies a rule for determining that the authentication request is subject to an ongoing attack.

Aspect 11. The method of any of Aspects 1 to 10, wherein the particular authentication technique is a push to an authentication device, wherein the rule defines a threshold for a number of push requests sent by the authentication service that have timed-out, wherein the authentication service determines that the user account is under attack when greater than a threshold number of push requests sent by the authentication service have timed-out.

Aspect 12. The method of any of Aspects 1 to 11, wherein the particular authentication technique is a push to an authentication device, wherein the rule defines a threshold for a number of push requests sent by the authentication service that have been declined, wherein the authentication service determines that the user account is under attack when greater than a threshold number of push requests sent by the authentication service have been declined.

Aspect 13. The method of any of Aspects 1 to 12, wherein the particular authentication technique is a push to an authentication device, wherein the rule defines a threshold for a number of authentication requests received by the authentication service that originate from an IP address but are requested on behalf of different user accounts, wherein the authentication service determines the resource is under attack when the threshold is exceeded.

Aspect 14. The method of any of Aspects 1 to 13, wherein the particular authentication technique is a push to an authentication device, wherein the rule defines that when the user account is attempting to authenticate from an IP address not previously associated with the user account that the user account may be under attack.

Aspect 15. The method of any Aspects 1 to 14, wherein determination that the user account is under attack indicates at least one of a push fatigue attack, a brute force attack, an adversary-in-the-middle-attack, a passcode phishing attack, and a push harassment attack.

Aspect 16. The method of any of Aspects 1 to 15, wherein the access policy is defined by the resource.

Aspect 17. The method of any of Aspects 1 to 16, wherein some services will see the characteristics associated with some attacks as normal below individualized thresholds, such as if a service utilizes a VPN for access devices, the same user account may routinely attempt to authenticate from different IP addresses and this would be normal within a threshold configured by the service.

Aspect 18. The method of any of Aspects 1 to 17, wherein the access policy includes an attack mitigation requirement, the attack mitigation requirement defining when the alternative authentication technique should be applied to the user account, and when the alternative authentication technique should be applied to all requests for authentication to the resource.

Aspect 19. The method of any of Aspects 1 to 18, wherein the alternative authentication technique includes a multi-device push or authentication using WebAuthn.

Aspect 20. The method of any of Aspects 1 to 19, wherein the multi-device push includes: sending an access code to the access device for entry into the authentication device; receiving the access code from the authentication device.

What is claimed is:

1. A method, the method comprising:
   receiving, by an authentication service, an authentication request to authenticate to a first resource, wherein an authentication to the first resource is permitted using a authentication technique, wherein the authentication request includes contextual information associated with a first access device of the authentication request and information identifying the first resource;
   based on the contextual information, determining that the authentication request is subject to an ongoing attack;
   determining, an alternative authentication technique that is less vulnerable to the ongoing attack than the authentication technique; and
   requiring a first user account to authenticate with the first resource using the alternative authentication technique that is less vulnerable to the ongoing attack than the authentication technique.

2. The method of claim 1, wherein the authentication service is a multi-factor authentication service and the authentication technique and the alternative authentication technique are multi-factor authentication techniques.

3. The method of claim 1, further comprising:
   presenting a user interface for a primary authentication technique to authenticate the first user account with the first resource;
   after successful completion of the primary authentication technique, sending the authentication request to the authentication service, wherein the contextual information associated with the first access device includes one or more of data identifying a network from which the first access device is connected, an IP address of the first access device, a browser version of a browser used to access the first resource, an identification of browser extensions installed in the browser used to access the first resource, an operating system on the first access device, and a type of device for the first access device;
   determining, by the authentication service, based on the contextual information and the information identifying the first resource that the authentication technique is permitted by a policy associated with the first resource;
   providing the authentication technique to the first user account; and
   determining that the first user account failed the authentication technique.

4. The method of claim 3, further comprising:
   prior to providing the authentication technique, offering options for at least two authentication techniques, wherein the first user account selects the authentication technique.

5. The method of claim 3, wherein determining that the first user account failed the authentication technique occurs prior to the determining that the authentication request is subject to the ongoing attack.

6. The method of claim 1, further comprising:
   setting a period in which an authentication provider will require the first user account to authenticate with the first resource using the alternative authentication technique before allowing the first user account to authenticate with the authentication technique.

7. The method of claim 1, wherein the first resource is associated with an access policy configured at the authentication service, the access policy specifies a rule for determining that the authentication request is subject to the ongoing attack.

8. The method of claim 1, wherein the authentication service determines characteristics associated with at least one attack is below individualized thresholds configured by the authentication service, such as if first resource utilizes a VPN for access devices, wherein the first user account may routinely attempt to authenticate from different IP addresses.

9. The method of claim 7, wherein the access policy includes an attack mitigation requirement, the attack mitigation requirement defining when the alternative authentication technique should be applied to the first user account, and when the alternative authentication technique should be applied to all requests for authentication to the first resource.

10. The method of claim 1, wherein the alternative authentication technique includes a multi-device push, wherein the multi-device push includes:
    sending an access code to the first access device for entry into an authentication device; and
    receiving the access code from the authentication device.

11. A non-transitory computer-readable storage medium, the non-transitory computer-readable storage medium including instructions that when executed by at least one processor, cause the at least one processor to:
    receive, by an authentication service, an authentication request to authenticate to a first resource, wherein authentication to the first resource is permitted using a authentication technique, wherein the authentication request includes contextual information associated with a first access device of the authentication request and information identifying the first resource;
    based on the contextual information, determine that the authentication request is subject to an ongoing attack;
    determine, an alternative authentication technique that is less vulnerable to the ongoing attack than the authentication technique; and
    require a first user account to authenticate with the first resource using the alternative authentication technique that is less vulnerable to the ongoing attack than the authentication technique.

12. The non-transitory computer-readable storage medium of claim 11, wherein the instructions further configure the at least one processor to:
    present a user interface for a primary authentication technique to authenticate the first user account with the first resource;
    after successful completion of the primary authentication technique, send the authentication request to the authentication service, wherein the contextual information associated with the first access device includes one or more of data identifying a network from which the first access device is connected, an IP address of the first access device, a browser version of a browser used to access the first resource, an identification of browser extensions installed in the browser used to access the first resource, an operating system on the first access device, and a type of device of the first access device;
    determine, by the authentication service, based on the contextual information and the information identifying the first resource that the authentication technique is permitted by a policy associated with the first resource;
    provide the authentication technique to the first user account; and determine that the first user account failed the authentication technique.

13. The non-transitory computer-readable storage medium of claim 12, wherein determining that the first user account failed the authentication technique occurs prior to the determination that the authentication request is subject to the ongoing attack.

14. The non-transitory computer-readable storage medium of claim 11, wherein the instructions further configure the at least one processor to:
    set a period in which the authentication service will require the first user account to authenticate with the first resource using the alternative authentication technique before allowing the first user account to authenticate with the authentication technique.

15. The non-transitory computer-readable storage medium of claim 11, wherein the first resource is associated with an access policy configured at the authentication service, the access policy specifies a rule for determining that the authentication request is subject to the ongoing attack.

16. A computing system of an authentication service comprising:
    a processor; and
    a memory storing instructions that, when executed by the processor, configure the computing system to:
        receive an authentication request to authenticate to a first resource, wherein authentication to the first resource is permitted using a authentication technique, wherein the authentication request includes contextual information associated with a first access device of the authentication request and information identifying the first resource;
        based on the contextual information, determine that the authentication request is subject to an ongoing attack;
        determine, an alternative authentication technique that is less vulnerable to the ongoing attack than the authentication technique; and
        require a first user account to authenticate with the first resource using the alternative authentication technique that is less vulnerable to the ongoing attack than the authentication technique.

17. The computing system of claim 16, wherein the instructions further configure the computing system to:
    present a user interface for a primary authentication technique to authenticate the first user account with the first resource;
    after successful completion of the primary authentication technique, send the authentication request to the authentication service, wherein the contextual information associated with the first access device includes one or more of data identifying a network from which the first access device is connected, an IP address of the first access device, a browser version of a browser used to access the first resource, an identification of browser extensions installed in the browser used to access the first resource, an operating system on the first access device, and a type device of the first access device;
    determine, by the authentication service, based on the contextual information and the information identifying the first resource that the authentication technique is permitted by a policy associated with the first resource;
    provide the authentication technique to the first user account; and
    determine that the first user account failed the authentication technique.

18. The computing system of claim 17, wherein determining that the first user account failed the authentication technique occurs prior to the determination that the authentication request is subject to the ongoing attack.

19. The computing system of claim 16, wherein the instructions further configure the computing system to:
    set a period in which the authentication service will require the first user account to authenticate with the first resource using the alternative authentication technique before allowing the first user account to authenticate with the authentication technique.

20. The computing system of claim 16, wherein the first resource is associated with an access policy configured at the authentication service, the access policy specifies a rule for determining that the authentication request is subject to the ongoing attack.

* * * * *